Jan. 21, 1941.     C. C. UTZ     2,229,354
WHEEL SUSPENSION
Filed Jan. 23, 1939
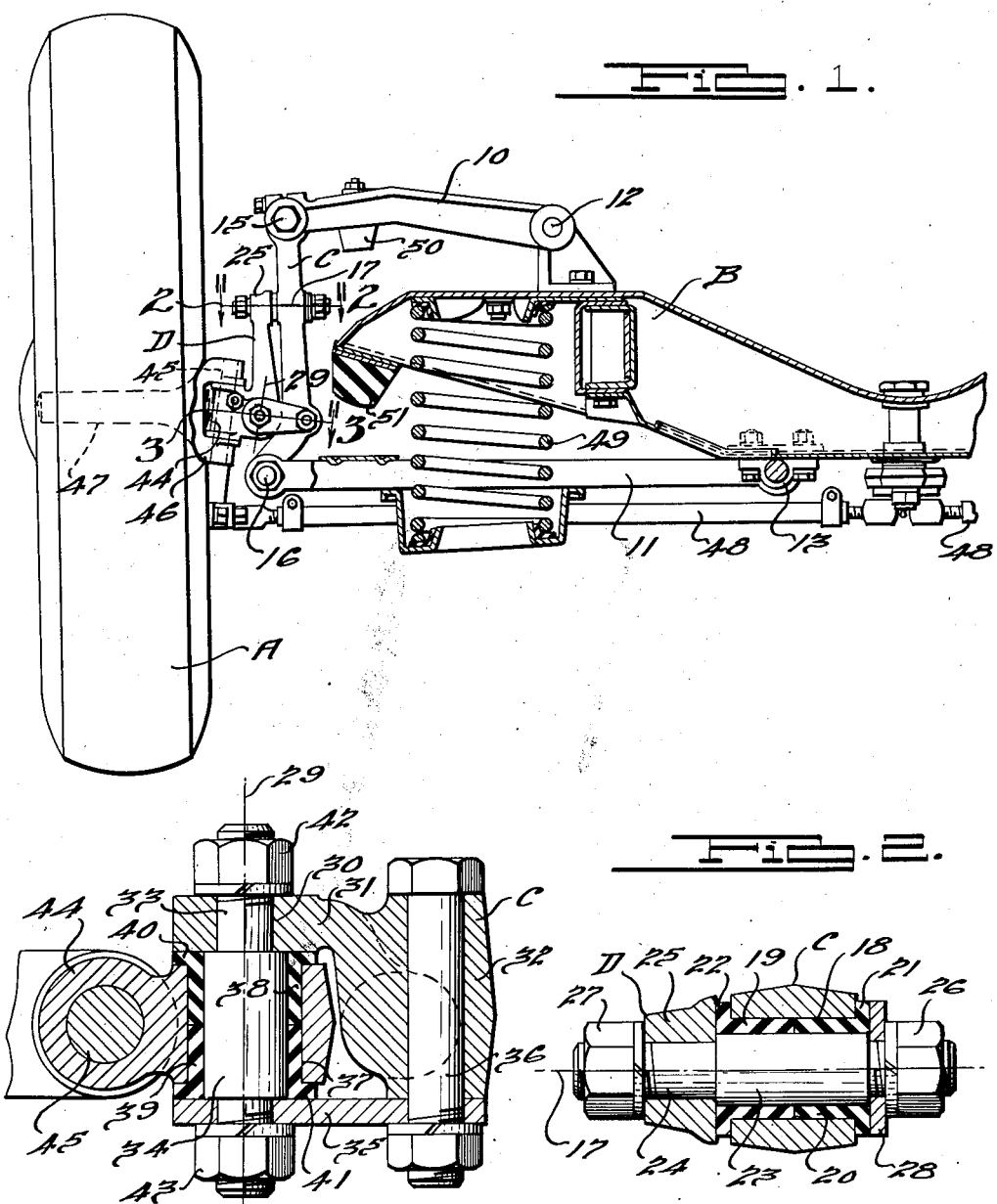
INVENTOR
Chester C. Utz.
BY
Harness, Dick, Patee & Harris
ATTORNEYS.

Patented Jan. 21, 1941

2,229,354

UNITED STATES PATENT OFFICE 2,229,354

WHEEL SUSPENSION

Chester C. Utz, Detroit, Mich., assignor to Chrysler Corporation, Highland Park, Mich., a corporation of Delaware Application January 23, 1939, Serial No. 252,303

17 Claims. (Cl. 267—20)

This invention relates to motor vehicles and refers more particularly to improvements in suspensions for ground wheels of motor vehicles.

It is an object of my invention to provide simplified and improved means for insulating motor vehicle ground wheels from the supported vehicle frame and body structure whereby road shocks and vibrations are effectively dampened against transmission to the vehicle structure.

Another object is to improve the riding qualities of the vehicle by means providing limited movement in all directions of the wheel relative to the frame structure, preferably by the provision of cushioning means of a rugged character so disposed as to absorb the road shocks and vibrations closely adjacent the wheel and before the shocks act on the suspension system for the wheel.

My invention is especially adapted for use in connection with independently sprung ground wheels and embodies a wheel supporting arm (steering knuckle support arm in the case of a steerable ground wheel) which is insulated from the ground wheel whereby the road shocks are absorbed at points between the ground wheels and the independent suspension linkage. Such an arrangement eliminates the necessity or desirability of providing shock absorbing bushings and the like at the various pivots of the linkage system and affords a universal insulated support of the wheel on the support arm.

Another object of my invention is to provide a wheel insulating means employing a minimum amount of rubber while providing a high degree of stability for the wheel, my arrangement providing an efficient location of the rubber or other equivalent insulating material.

Further objects and advantages of my invention will be more apparent from the following detail description of one illustrative embodiment of my invention, reference being had to the accompanying drawing in which:

Fig. 1 is a front elevational view of a typical ground wheel suspension embodying my invention.

Fig. 2 is a sectional plan view taken as indicated by line 2—2 on Fig. 1.

Fig. 3 is a further sectional plan view taken as indicated by line 3—3 on Fig. 1.

In the drawing I have illustrated my invention in connection with a steerable ground wheel A, it being understood that the opposite wheel is similarly suspended. The suspension system is, in general, a well known type embodying upper and lower wish-bone links 10 and 11 which are pivotally supported on the vehicle frame structure B at 12 and 13 respectively.

The links 10 and 11 extend laterally outwardly for pivotal connection at 15 and 16 respectively with the upper and lower ends of the upright knuckle support arm C which is so constructed as to provide a pair of vertically spaced support axes at right angles to each other for mounting a resilient cushion preferably in the form of a rubber composition body.

The upper support axis 17 extends generally transversely of the vehicle and is formed by an opening 18 extending transversely through arm C, this opening receiving cushioning means conveniently formed as rubber bushings 19, 20 having external enlarged annular flanges 21, 22 engaging the opposite side faces of arm C. The bushings receive a transverse pin 23 on the outer shouldered end 24 of which is mounted the upper end portion 25 of a knuckle member D. Pin 23 has the opposite nuts 26, 27 serving to hold the parts assembled and to force the bushings 19, 20 tightly in place under end compressive stress whereby the bushings will yield internally without surface slippage. The portion 25 engages flange 22 and a washer 28 engages the opposite flange 21. The bushings 19, 20 with their flanges 21, 22 maintain the member D connected to arm C and completely insulated therefrom against metal to metal contact.

Near its lower end, the arm C provides the lower support axis 29 at right angles with axis 17. This lower axis is formed by a second opening 30 extending generally longitudinally through an outwardly projecting bracket portion 31 of arm C at the region thereof where a boss 32 is formed. The opening 30 receives the shouldered end portion 33 of a pin 34 whose opposite end is supported by a link 35 which is secured by a bolt assembly 36 at boss 32.

The member D has its lower position formed with an opening 37 receiving cushioning means in the form of another set of rubber bushings 38, 39 tightly engaging pin 34, the outer flanges 40, 41 being clamped between link 35 and bracket 31 by the headed fasteners 42, 43 whereby the bushings 38, 39 are squeezed into place free from surface slipping.

The member D has a knuckle portion 44 receiving a king-pin 45 for swivelling the knuckle yoke 46 of the usual wheel journalling stub axle 47. Suitable steering mechanism is provided such as tie rod 48 for swinging yoke 46 and axle 47 about the king-pin 45 when steering the wheel A to the right and left.

When wheel A rises and falls, the member D, which carries the wheel, acts through the rubber bodies 19, 20 and 38, 39 in transmitting the movement to arm C, the links 10 and 11 oscillating and maintaining the wheel at approximately constant caster and camber angles. A coil spring 49 yieldingly supports frame B on lower link 11, bumpers 50, 51 serving to yieldingly limit vertical displacement of the wheel relative to the frame.

The arm C is completely insulated by the rubber bushings from knuckle member D and the latter member may have a limited movement in any direction relative to arm C in absorbing shocks and vibrations. A high degree of lateral stability is afforded between the wheel A and frame B as when the wheel tends to be displaced laterally. Likewise fore and aft thrusts are cushioned and efficiently absorbed by the rubber bodies.

When the wheel A is suddenly lifted, the member D fulcrums about axis 29 thrusting the upper portion 25 inwardly at axis 17. The bodies 38, 39 are internally stressed by torsional shear at their main body portions and also at their flanges 40, 41. The bodies 19, 20 have their body portions placed in longitudinal shear while flange 22 is compressively stressed, flange 21 being compressively stressed when wheel A drops suddenly relative to the frame.

For resisting lateral thrusts on the wheel A, the member D also fulcrums about axis 29 and thrusts along axis 17. Longitudinal wheel thrust, as during wheel braking, causes member D to fulcrum about axis 17 and thrust along axis 29 in which instance the bodies 19, 20 are torsionally stressed in shear while bodies 38, 39 are placed in axial shear and compressed at flange 40 or 41. Thus under different conditions each axis 17 and 29 is a fulcruming axis and the other axis is an axis of thrust. Should the rubber bodies fail, the parts will nevertheless maintain their general assembled relationship so that serious injury to the vehicle passengers will be prevented.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a suspension for a motor vehicle ground wheel, wheel carrying means, an upright wheel supporting arm, linkages swingingly connected to the vehicle frame structure and to the opposite ends of said arm to accommodate rising and falling of the wheel independently of the remaining ground wheels of the vehicle, and a plurality of means yieldingly connecting said carrying means with said arm at relatively vertically spaced points and accommodating limited universal movement of the wheel relative to the arm.

2. In a suspension for a motor vehicle ground wheel, wheel carrying means, an upright wheel supporting arm, linkages swingingly connected to the vehicle frame structure and to the opposite ends of said arm to accommodate rising and falling of the wheel independently of the remaining ground wheels of the vehicle, and means including a plurality of nonmetallic bodies yieldingly connecting said arm with said wheel carrying means at relatively spaced points along said arm.

3. In a suspension for a motor vehicle ground wheel, wheel carrying means, an upright wheel supporting arm, linkages swingingly connected to the vehicle frame structure and to the opposite ends of said arm to accommodate rising and falling of the wheel independently of the remaining ground wheels of the vehicle, and means including a plurality of relatively spaced rubber bodies connecting said arm and carrying means for accommodating relative universal movement therebetween.

4. In a suspension for a motor vehicle ground wheel, wheel carrying means, an upright wheel supporting arm, linkages swingingly connected to the vehicle frame structure and to the opposite ends of said arm to accommodate rising and falling of the wheel independently of the remaining ground wheels of the vehicle, and a plurality of relatively vertically spaced means yieldingly maintaining said arm and carrying means spaced from each other while serving to connect them together for limited relative movement therebetween.

5. In a suspension for a motor vehicle ground wheel, wheel carrying means, an upright wheel supporting arm, linkages swingingly connected to the vehicle frame structure and to the opposite ends of said arm to accommodate rising and falling of the wheel independently of the remaining ground wheels of the vehicle, and a plurality of relatively spaced annular bodies yieldingly maintaining said arm and carrying means spaced from each other while serving to connect them together for limited universal movement relative to each other.

6. In a suspension for a motor vehicle ground wheel, an upright wheel supporting arm structure, means swingingly connecting said arm structure to the vehicle frame, a wheel carrying structure, and a plurality of rubber bushings spaced vertically from each other along said arm structure for yieldingly connecting said structures together.

7. In a suspension for a motor vehicle ground wheel, an upright wheel supporting arm structure, means swingingly connecting said arm structure to the vehicle frame, a wheel carrying structure, and means for connecting said structures together for limited relative movement on predetermined axes extending transversely of each other.

8. In a suspension for a motor vehicle ground wheel, an upright wheel supporting arm structure swingingly connected to the vehicle frame, a wheel carrying structure, and a pair of rubber bushings yieldingly connecting said structures together, said bushings having relatively transversely disposed axes on which said structures have relative movement.

9. In a suspension for a motor vehicle ground wheel, an upright wheel supporting arm structure swingingly connected to the vehicle frame, a wheel carrying structure, and a plurality of rubber bushings spaced vertically from each other along said arm structure for yieldingly connecting said structures together, each of said bushings providing an axis of oscillation for said wheel carrying structure for thrust between said structures at another of said bushings.

10. In a suspension for a motor vehicle ground wheel, an upright wheel supporting arm structure swingingly connected to the vehicle frame, a wheel carrying structure, means connecting said structures together for limited oscillation of said wheel carrying structure about an axis extending generally transversely of the vehicle, and means connecting said structures together for limited oscillation of said wheel carrying structure about an axis spaced vertically from the first said axis and extending generally longitudinally of the vehicle.

11. In a suspension for a motor vehicle ground wheel, an upright wheel supporting arm structure swingingly connected to the vehicle frame, a wheel carrying structure, means connecting said structures together for limited oscillation of said wheel carrying structure about an axis extending generally transversely of the vehicle, and means connecting said structures together for limited oscillation of said wheel carrying structure about an axis spaced vertically from the first said axis and extending generally longitudinally of the vehicle, each of said connecting means including a rubber body adapted to resist thrust of said wheel carrying structure along one of said axes while said wheel carrying structure oscillates about the other of said axes.

12. In a suspension for a motor vehicle ground wheel, a wheel carrying structure, a structure for mounting said wheel carrying structure on the vehicle frame for swinging movement relatively thereto, means comprising a pair of annular bushings connecting said structures together for limited movement relatively therebetween, the axes of said bushings being disposed approximately at right angles with one another.

13. In a suspension for a motor vehicle ground wheel, a wheel carrying structure, a structure for swingingly mounting said wheel carrying structure on the vehicle frame to accommodate rising and falling of the wheel independently of the remaining ground wheels of the vehicle, means connecting said structures together for limited movement relatively therebetween on axes disposed approximately at right angles with one another, said connecting means comprising a pair of support members relatively disposed at approximately right angles with each other so as to provide said axes of movement, said connecting means accommodating oscillation of said wheel carrying structure about each of said axes accompanied by thrust of said wheel carrying structure along the other of said axes.

14. In a suspension for a motor vehicle ground wheel, a wheel carrying structure, a structure for swingingly mounting said wheel carrying structure on the vehicle frame to accommodate rising and falling of the wheel independently of the remaining ground wheels of the vehicle, means connecting said structures together for limited movement relatively therebetween on axes disposed approximately at right angles with one another, said connecting means comprising a pair of support members relatively disposed at approximately right angles with each other so as to provide said axes of movement, said connecting means further comprising a rubber body associated with each of said axes and maintaining said structures out of engagement with each other.

15. In a suspension for a motor vehicle ground wheel, a wheel carrying structure, a structure for swingingly mounting said wheel carrying structure on the vehicle frame to accommodate rising and falling of the wheel independently of the remaining ground wheels of the vehicle, means connecting said structures together for limited movement relatively therebetween on axes disposed approximately at right angles with one another, said connecting means including a pair of connector members relatively disposed at approximately right angles with each other providing said axes of movement, a rubber bushing surrounding each of said axes and yieldingly accommodating movement of said wheel carrying structure selectively about said axes, each of said bushings having an annular shoulder adapted to yieldingly resist thrust of said wheel carrying structure along said axes.

16. In a suspension for a motor vehicle ground wheel, a wheel carrying structure, a structure for swingingly mounting said wheel carrying structure on the vehicle frame to accommodate rising and falling of the wheel independently of the remaining ground wheels of the vehicle, means connecting said structures together for limited movement relatively therebetween on axes disposed approximately at right angles with one another, said means including a pair of connector members relatively disposed at approximately right angles with each other providing said axes of movement, said connecting means accommodating oscillation of said wheel carrying member selectively about said axes accompanied by thrust of said wheel carrying member along the other axis.

17. In a suspension for a motor vehicle ground wheel, an upright arm, linkage, means pivotally connecting said linkage to the vehicle frame and to the opposite ends of said upright arm, a wheel support, and a plurality of non-metallic bodies of deformable material relatively spaced from each other lengthwise of said upright arm and disposed between the pivotal connections of said upright arm and linkage for yieldingly connecting the wheel support with said upright arm and accommodating limited relative movement therebetween.

CHESTER C. UTZ.